United States Patent [19]

Nakajima et al.

[11] Patent Number: 5,111,442
[45] Date of Patent: May 5, 1992

[54] RECORDABLE OPTICAL DISC STORAGE DEVICE WITH LIMITED STORAGE CAPACITY, AND RECORDING APPARATUS THEREFOR

[75] Inventors: Heitaro Nakajima, Tokyo; Masahiro Hotori; Hiroshi Ogawa, both of Kanagawa; Kazuhiko Fujiie, Tokyo, all of Japan

[73] Assignee: Sony Corporation, Tokyo, Japan

[21] Appl. No.: 408,079

[22] Filed: Sep. 15, 1989

[30] Foreign Application Priority Data

Sep. 20, 1988 [JP] Japan ............................ 63-235442
Sep. 24, 1988 [JP] Japan ........................ 63-125000[U]

[51] Int. Cl.⁵ .............................................. G11B 7/00
[52] U.S. Cl. ........................................ 369/47; 369/54; 360/6
[58] Field of Search ............... 360/15, 137, 74.4, 6, 360/114, 132; 369/53-58, 13, 47, 32

[56] References Cited

U.S. PATENT DOCUMENTS 4,802,048 1/1989 Perkins et al. ................ 360/132

FOREIGN PATENT DOCUMENTS 0215133 3/1987 European Pat. Off. .

Primary Examiner—Robert L. Richardson
Attorney, Agent, or Firm—Hill, Van Santen, Steadman & Simpson

[57] ABSTRACT

The optical disc according to the present invention includes an unrewritable region in which the number of times of possible recording or the cumulative possible recording time duration is recorded in advance. The apparatus for recording signals on this optical disc according to the present invention reproduce the number of times of possible recording or the cumulative possible recording time duration recorded in the unrewritable region of the optical disc and inhibits the recording operation when the number of times of recording or the cumulative recording time duration exceeds the aforementioned number of times of possible recording or the cumulative possible recording time duration.

12 Claims, 4 Drawing Sheets

RECORDABLE OPTICAL DISC STORAGE DEVICE WITH LIMITED STORAGE CAPACITY, AND RECORDING APPARATUS THEREFOR

BACKGROUND OF THE INVENTION

This invention relates to an optical disc and an apparatus for recording signals on the disc. More particularly, it relates to an optical disc adapted for limiting the number of times of recording or recording time duration, and an apparatus for recording signals on the disc.

Recently, attempts have been made to evolve a write-once type optical disc or a rewritable optical disc, on which musical sound data may be written according to the data format comparable with that used for a compact disc (CD).

This write-once type optical disc has a data record region in which musical sound data may be written spirally circumferentially, and a lead-in region disposed on the inner peripheral side of the data record region and in which table of contents (TOC) data for the musical sound data may be written, with the musical sound data and the table of contents data therefor being written only once by the user. The musical sound data written in the data record region of the write-once type disc may be reproduced on the basis of the table of contents data written in the lead-in region.

Meanwhile, such write-once type disc has an extremely large capacity of the data record region into which the musical sound data of a large number of musical pieces can be written.

However, with a view to simplifying the control or superintention of the musical sound data written into the data record region, there is also a demand for the write-once type optical disc in which only the musical sound data of a predetermined number of musical pieces can be written in its data record region.

There has also been known a rewritable disc in which audio or video signals are recorded by taking advantage of magnetic induction or the photomagnetic effect (Kerr effect). While the record signals are rewritten in this rewritable disc by a recording system, it is frequently desirable to limit the number of times of rewriting or the cumulative recording time duration.

The present invention is useful whenever it is desired to limit the recording capacity of the disc. For example, if a disc is of the type which is reliably written only once, without a capacity for erasure and rewriting, or overwriting, the present invention prevents any attempt to perform erasure and overwriting. Also, even in the case of a disc which is capable of overwriting, or erasure and rewriting, it is sometimes desirable to limit the number of writings of any recordable area to exactly once, to avoid any undesirable residual effects from a previous recording, and/or to comply with other special requirements which may be imposed, such as, for example, consideration for copyright protection of material which may be recorded on the disc.

SUMMARY OF THE INVENTION

It is an object of the present invention to provide an improved optical disc and an apparatus for recording signals on the disc.

It is another object of the optical disc in which the number of times of recording or the cumulative recording time duration may be limited and an apparatus for recording signals on the disc.

For accomplishing the above objects, the present invention provides an optical disc including a record region in which signals may be recorded and an unrewritable region in which are recorded the number of times of possible recording in the record region or the cumulative possible recording time duration.

The present invention also provides a recording apparatus including means for reproducing the number of times of possible recording or the cumulative possible recording time duration recorded on an unrewritable region of the disc and means for inhibiting the recording operation when the number of times of recording or the cumulative recording time duration exceeds the number of times of possible recording or the cumulative possible recording time duration.

The above and other objects of the present will become more apparent from the following description of preferred embodiments thereof especially when read in conjunction with the accompanying drawings.

DESCRIPTION OF THE PREFERRED EMBODIMENTS

Figure 1:
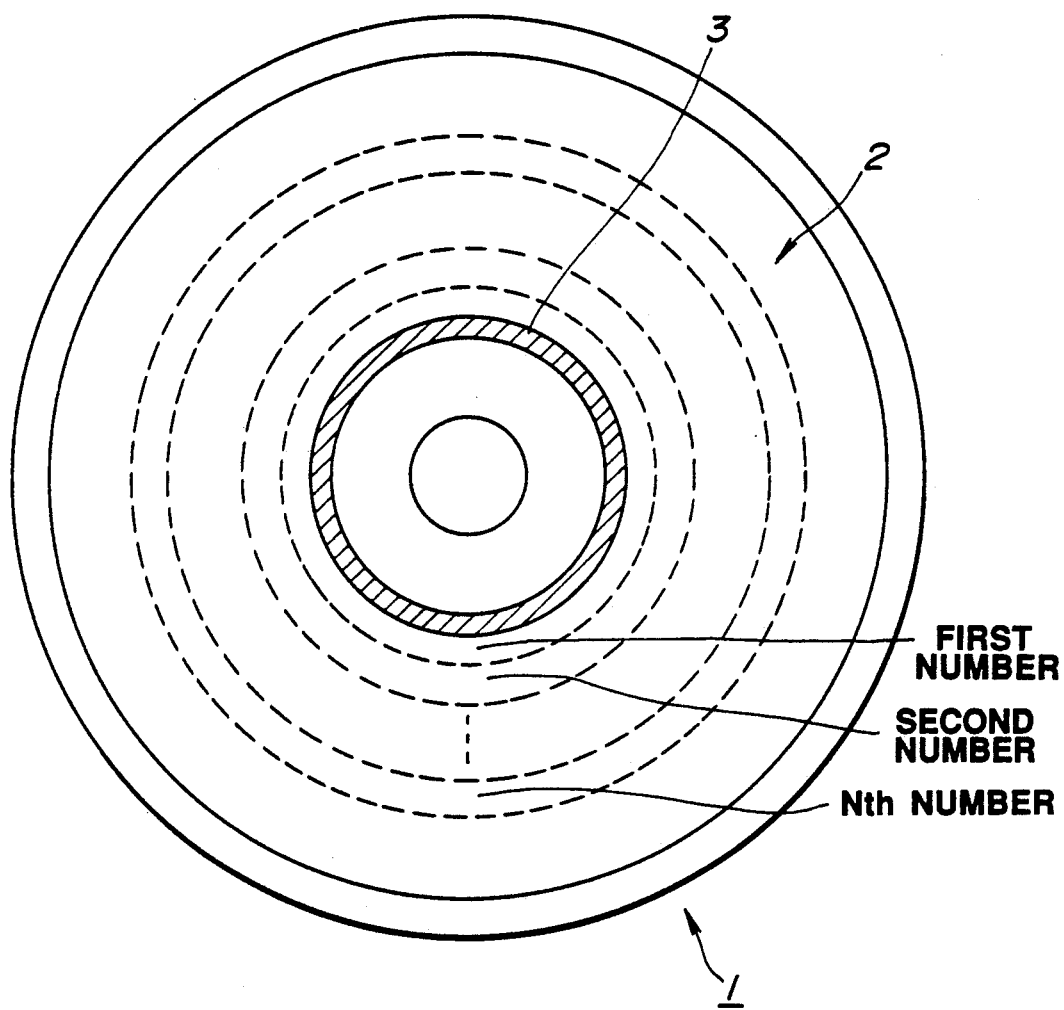
FIG. 1 is a diagrammatic view for illustrating an optical disc according to the present invention.

Referring to FIG. 1, a first embodiment of the present invention will be explained in detail.

In this figure, a write-once type optical disc 1, on which signals can be recorded once and for all, according to the present illustrative embodiment, has a data record region 2 on which musical sound data, for example, can be written spirally along the circumference of the disc, and a lead-in region 3, which is provided on the inner periphery of the data record region 2 and in which table of contents data for the musical sound data are written. Data recording is made on the disc 1 in accordance with the data format similar to that of the compact disc (CD).

In the data record region 2, there are previously recorded an absolute time information and a synch information on predetermined tracks formed by a write-once type optical recording medium, such as by wobbling techniques, and the user can write musical sound data, for example, only once and for all on the basis of these informations.

In the lead-in region 3, there are previously written the table of contents information for dividing the data record region 2 by a predetermined number of musical pieces. That is, there are written in the lead-in region 3, as the table of contents information, the absolute time of start of each musical piece, such as, for example, $A_1A_2$ minute $A_3A_4$ second $A_5A_6$ frame for the first musical piece and the absolute time of end of the last musical piece (the N'th piece), such as $O_1O_2$ minute $O_3O_4$ second and $O_5O_6$ frame, in regular order for all of the musical pieces to be written into the data record region 2, as shown in the following Table 1.

TABLE 1

| Start of 1'st tune | $A_1A_2$ min. | $A_3A_4$ sec. | $A_5A_6$ frame |
| --- | --- | --- | --- |

TABLE 1-continued

| | | | |
|---|---|---|---|
| Start of 2'nd tune | $B_1B_2$ min. | $B_3B_4$ sec. | $B_5B_6$ frame |
| Start of N'th tune | $N_1N_2$ min. | $N_3N_4$ sec. | $N_5N_6$ frame |
| end of N'th tune | $O_1O_2$ min. | $O_3O_4$ sec. | $O_5O_6$ frame |

Thus the writing of the musical sound data into the data record region 2 is performed in accordance with the table of contents information in the lead-in region 3. Hence, only the musical sound data for a predetermined number, that is, the N-number, of the musical pieces can be written on the write-once type optical disc 1. Moreover, the table of contents data cannot be rewritten since they are written as projections and recesses defined by pits. Therefore, the number of the musical pieces that can be written in the data record region 2 cannot be changed. Thus it is possible with the present embodiment of the write-once type optical disc 1 to limit the number of the musical pieces of the musical sound data that can be written in the data record region 2 to a predetermined number, that is, to the N-number.

It is noted that, when the play time for the musical sound actually recorded on the disc is shorter than the time interval previously set by the table of contents data, there is formed an area in which the musical sound data is not written after the end of the performance. In such area, there can be written silent sound data after recording of the musical sound data. Alternatively, a write-once type disc 1 may be used, in which there may be obtained reproduced RF signals equivalent to those obtained when the silent-sound data are reproduced from the unrecorded data record regin 2, in which case a satisfactory reproduction may be made even when writing of the musical sound data should be discontinued on termination of performance. In addition, if control signals or the like indicating the end of the musical sound data for the musical piece are recorded by a data recording device at the end of the performance, and these signals are detected by a data reproducing device during reproduction, it becomes possible to repeat the performance of the musical piece that has just come to an end, or to start the next piece of music.

In the above described embodiment of the write-once type optical disc, there are previously written in the table of contents region unrewritable table of contents data whereby the data record region for writing the musical sound data is divided into regions for a predetermined number of musical pieces.

In this manner, it becomes possible to write in the data record region only musical sound data for a predetermined number of musical pieces in accordance with the table of contents data written into the lead-in region. Also, inasmuch as the table of contents data in the lead-in region cannot be rewritten, it is not possible to change the number of musical pieces that can be recorded in the data record region.

Therefore, in the above described write-once type optical disc, it becomes possible to limit the number of musical pieces that can be written in the data record region to simplify the control or supervision, for example, of the musical sound data.

A second embodiment of the present invention will be explained by referring to the accompanying drawings.

Figure 2:
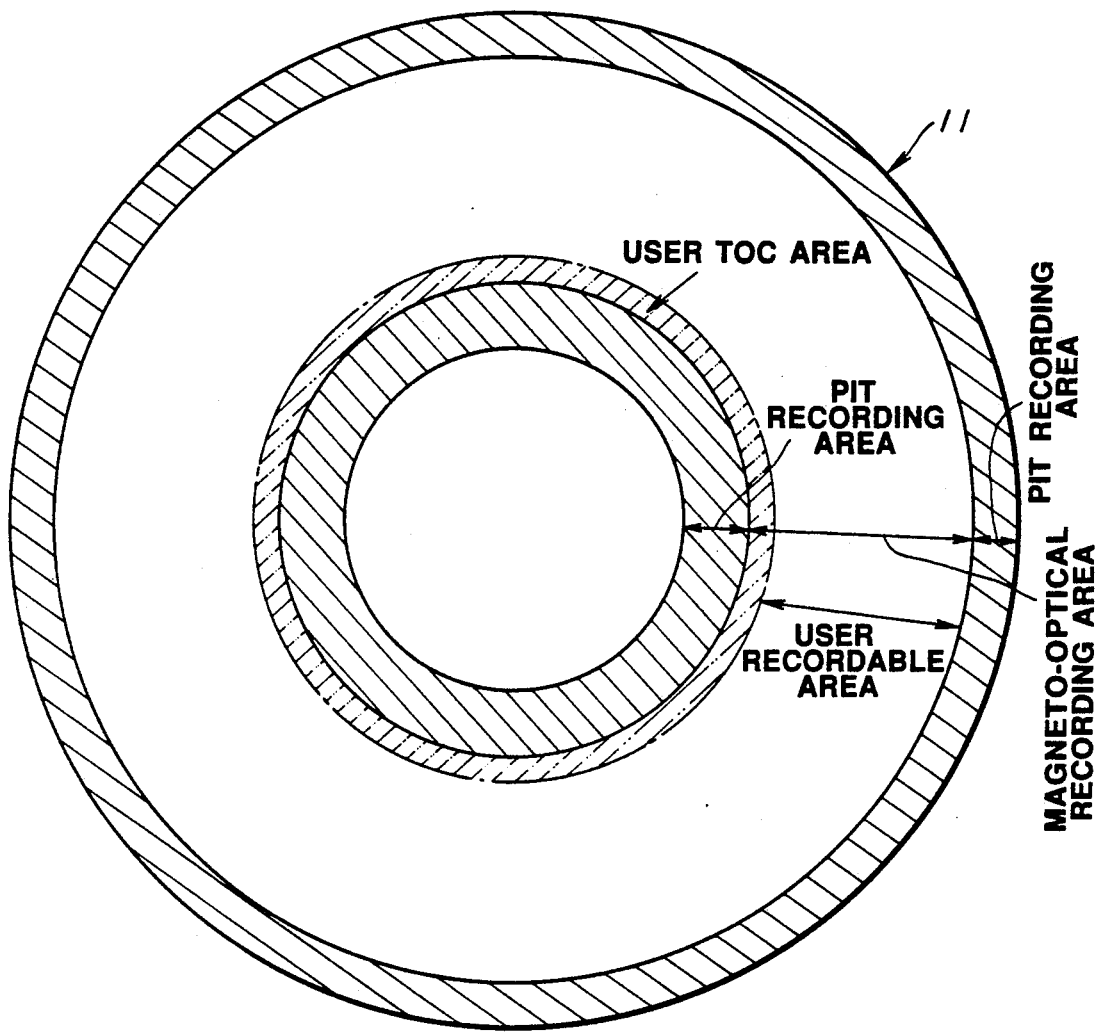
FIG. 2 is a view similar to FIG. 1 and showing another optical disc according to the present invention.

A rewritable magneto-optical disc 11 according to the present invention is shown in FIG. 2 and has pit record areas on the innermost and outermost sides and a magneto-optical recording area between the pit record areas. In these pit record areas, there are written pit signals at the plant by injection molding such that these pit record areas represent the regions which can be reproduced but on which recording cannot be made by the recording and/or reproducing device. The magneto-optical recording area represents a region in which photomagnetic signals can be written and re-written and in which both recording and reproduction may be made by the recording/reproducing system.

Figure 3:
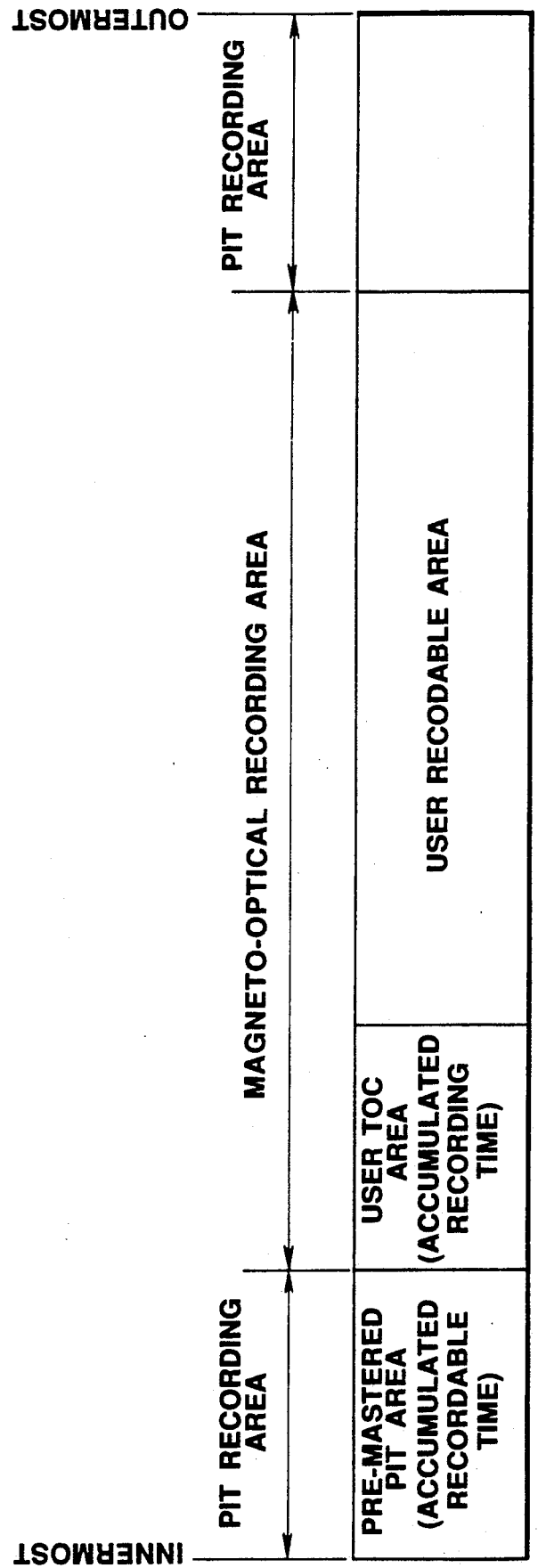
FIG. 3 shows a format for the optical disc according to the present invention.

The format for the disc 11 is shown in FIG. 3, wherein the pit record area on the innermost side of the disc is arranged as the pre-mastered pit area. In this area, there are recorded various data for the disc 11 on the whole and data indicating the number of times of possible recording and the cumulative possible recording time duration. The number of times of possible recording or the cumulative possible recording time represents the maximum number of times of possible recording or the maximum cumulative possible recording time duration, inclusive of an infinite number or infinite length of time, that may be decided by a variety of factors, such as the makers' intention or social constraints. The magneto-optical recording area is divided into a user-TOC (table of contents) area and a user recordable area. These areas represent regions on which data recording, reproduction and rewriting may be made by the recording/reproducing system. The user recordable area is designed as the region on which data recording and erasure of the recorded data may be made by the users' operation. The user TOC area is designed as the region on which data recording and erasure of the recorded data cannot be made by the users' operation. In the user-TOC area, there is provided, in addition to the region for recording the record time, for example, of the recording made by the user on the user recordable area, a region for the number of times of recording or a region for the cumulative recording time duration. In the region for the number of times of recording and the region for the cumulative recording time duration, there is recorded the cumulative recording time duration or the number of times of recording made by the user on the user recordable area.

Figure 4:
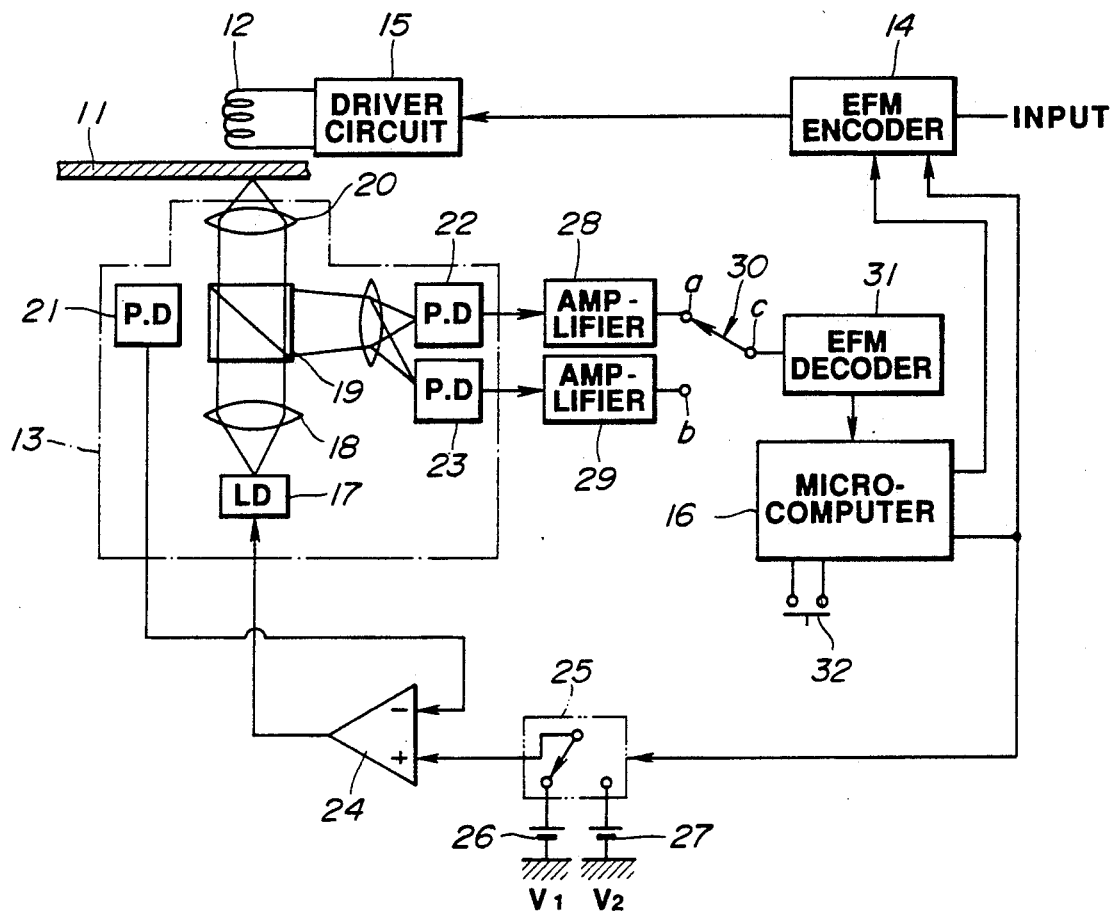
FIG. 4 is a diagrammatic view showing an apparatus for recording and/or reproducing signals on or from the disc according to the present invention.

The configuration of the recording/reproducing system employing the recordable magneto-optical disc as the recording medium is shown in FIG. 4, wherein a magnetic head 12 and an optical pickup 13 are arranged on the upper and lower sides of the disc 11.

The magnetic head 12 is driven by a driven circuit 15 which is drive-controlled on the basis of write signals of an EFM (eight-to-fourteen) encoder 14 to produce an alternating magnetic field. This EFM encoder 14 converts the input digital signals from 8-bit signals into 14-bit signals, in accordance with a predetermined system, while simultaneously converting data signals from a microcomputer 16 into 14-bit signals convenient for recording. This EFM encoder 14 is driven by recording mode signals from the microcomputer 16.

The optical pickup 13 has a laser diode 17, a collimator lens 18, a deflection beam splitter 19 and an object lens 20, and functions to radiate the laser emanating from the laser diode 17 towards the disc 11 as a laser beam spot. The light reflected by the disc 11 is adapted to be received by three photodiodes 21 to 23. The output of photodiode 21 is transmitted to one input of an operational amplifier 24, the output of which drive-controls the power of the laser diode 17. To the other input of the operational amplifier 24, there is selectively supplied a power from a reproducing power source 26 or a power from a recording power source 27 by way of a switch 25. The switching of the switch 25 is controlled by a reproducing mode signal and a recording mode signal. The other two photodiodes 22, 23 are adapted to receive the pit signals and the photomagnetic signals, respectively. The outputs of the photodiodes 22, 23 are transmitted to fixed terminals a, b of a switch 30. The switching of the switch 30 is also taken charge of by a control signal from the microcomputer 16, in a manner not shown. A selection terminal c of the switch 30 is connected to an EFM (eight-to-fourteen) decoder 31 so that the signals from the photodiodes 22, 23 are converted in the EFM decoder 31 from the 14-bit signal into the 8-bit signal. The output of the EFM decoder 31 is transmitted to the microcomputer 16.

The microcomputer 16, operating to control the driving system for the magnetic head 12 and the optical pickup 13, the switches 25 and 30 and the EFM encoder 14, for executing various modes by selection signals from various switches inclusive of the recording switch 32, as described above, is provided with means for checking the number of times of recording or the recording time duration and means for recording the number of times of recording and the recording time duration. The checking means for checking the number of times or the recording time duration reads out on selection of the record mode both the number of times of possible recording or the possible recording time duration in the pre-mastered pit area of the disc 11 and the number of times of recording or the cumulative recording time duration in the user-TOC area, compares the numbers of times of recording or the time durations with each other and checks to see if the number of times of recording or the accumulated recording time exceeds the possible number of times of possible recording or the cumulative possible recording time duration. Should the number of times of recording or the cumulative recording time duration exceed the number of times of possible recording or the cumulative possible recording time, the recording mode is cancelled, and measures are taken of i) establishing the reproducing mode, ii) stopping the operation, iii) ejecting the disc or iv) illuminating the record inhibit lamp. Should the number of times of recording or the cumulative recording time duration not exceed the number of times of possible recording or the cumulative possible recording time duration, recording is initiated. The recording time duration record means checks for the number of times of recording or the recording time duration in the user recordable area, sums the number of time of recording or the recording time duration to the number of times of recording or the cumulative recording time duration read out by the recording time checking means and rewrites the number of times of recording or the recording time duration thus obtained in the number of times of recording area or in the cumulative recording time area on the disc 11.

The operation of the above described arrangement is explained hereinbelow. For simplicity of explanation, the during control of the magnetic head 12 and the optical pickup 13 is not explained.

When the operator turns on a recording switch 32, the microcomputer 16 senses that the recording mode has been selected. The number of times of recording or recording time duration check means of the microcomputer 16 outputs a reproducing mode signal to the switch 25 to change the position of the switch 25 to the reproducing power source 26, at the same time that a changeover signal to the switch 30 to change the position of the switch 30 to the fixed terminal a. The cumulative number of times of possible recording or cumulative possible recording time duration stored in the premastered pit area is read out via photodiode 22. These two are compared with each other and, should the cumulative number of times of recording or the cumulative recording time duration exceed the cumulative number of times of possible recording or cumulative possible recording time duration, the recording mode is cancelled and measures are taken for inhibiting recording, such as switching to the reproducing mode. Should the cumulative number of times of recording or the cumulative recording time duration not exceed the cumulative number of times of possible recording or cumulative possible recording time duration, the recording mode signal is transmitted to the switch 25 and to the EFM encoder 14 to initiate recording in the user recordable area. On initiation of the recording, the recording time duration recording means checks for the recording time and, on termination of the recording mode, sums the cumulative number of times of recording or the cumulative recording time duration read out by the recording time check means to the recording time. The data of the cumulative number of times of recording or the cumulative recording time duration thus obtained by summation is outputted to the EFM encoder 14 where the data are converted into predetermined signals which are then recorded by the magnetic head 12 in the cumulative number of times of recording area or the cumulative recording time duration area. That is, in the cumulative number of time of recording area or cumulative recording time duration area, the data of the cumulative number of times of recording or the cumulative recording time duration are updated each time recording is made in the user recordable area on the disc 11. Thus, by setting the cumulative possible recording time duration previously recorded on the disc 11 to the number of times requried in the N number of times of such updateing, it becomes possible to inhibit the rewriting of N or more number of times.

It is noted that the cumulative number of times of possible recording or the cumulative possible recording time duration is recorded in the premastered pit area, which represents an unrecordable area, and the actual cumulative number of times of possible recording or cumulative possible recording time duration is recorded in the user TOC area, which represents an area in which recording cannot be erased by the users' operation. Thus there is no risk of recording rewriting or erasure by the user and the number of times of recording or cumulative recording time is always limited on the basis of the previously recorded cumulative possible recording time.

In the present illustrative embodiment, the number of time of recording or recording time duration checking means proceed to comparing the number of times of possible recording or the cumulative possible recording time duration with the number of times of recording or the cumulative recording time duration recorded in the user-TOC area only once on selection of the recording mode. However, the arrangement may also be made so that comparison between the number of times of possible recording or the cumulative possible recording time and the number of times of recording or the cumulative recording time duration in the user TOC area and comparison between the number of times of recording or recording time duration and the number of times or duration of summation for the current recording mode is perform at any time during the recording mode. In such case, there is no risk of surpassing the number of times of possible recording or cumulative possible recording time duration.

In the present illustrative embodiment, recording in the number of times of recording area or the cumulative recording time area is performed by rewriting or replacing the preceding number of times of recording or cumulative recording time duration by the current number of times of recording or cumulative recording time duration. However, the arrangement may also be made so that the number of times of recording or the recording time duration is written individually for each recording and the number of times of recording or the cumulative recording time duration is detected by the microcomputer 16 adapted for summing the individual numbers of times of recording or the recording time duration. In such case, the number of times of recording or cumulative recording time duration area may be configured as the region in which writing may be made only once. The number of times of recording or the cumulative recording time durations may also be the possible recording time or the cumulative possible recording time less the actual number of times of recording or actual cumulative recording time duration, that is, the residual number of times of recording or the residual possible recording time duration. It would be convenient to the user if means should be provided for displaying the residual number of times of recording or the residual possible recording time duration.

In the above illustrative embodiment, the arrangement is so made that the number of times of possible recording or the cumulative possible recording time duration is entered as pit signals at the time of manufacture of the disc 11. However, should the number of times of possible recording or the cumulative possible recording time duration be recorded in an area which is specifically so designed as to be unrecordable by the users' recording/reproducing system but recordable by a special recording/reproducing system, it is possible to enter the number of times of possible recording or the cumulative possible recording time duration after preparation of the disc.

From the foregoing it is seen that the present invention provides an arrangement in which the number of times of possible recording or the cumulative possible recording time duration is recorded on the disc, and the number of times of recording area or the cumulative recording time duration area are provide for recording the actual number of times of recording or cumulative recording time duration, so that these time data may be obtained simply by reading out the number of times of possible recording or cumulative possible recording time duration recorded on the disc and the actual number of times of recording or cumulative recording time duration, with the result that control of the recording/reproducing system based on the number of times of possible recording or the cumulative possible recording time duration and the actual number of times of recording or cumulative recording time duration becomes feasible and hence the number of times of rewriting or cumulative recording time duration may be limited easily.

What is claimed is:

1. An apparatus for recording signals on an optical disc comprising means for reproducing the number of times of possible recording or the cumulative possible recording time duration recorded on an unrewritable region of the disc and means for inhibiting the recording operation when the number of times of recording or the cumulative recording time duration exceeds the number of times of possible recording or the cumulative possible recording time duration.

2. The apparatus according to claim 1 further comprising means for recording the number of times of recording or the cumulative recording time duration in the TOC region of the optical disc.

3. The apparatus according to claim 2 further comprdsing means for comparing the number of times of recording or the cumulative recording time duration recorded in said TOC region with the number of times of possible recording or the unwritable region.

4. The apparatus according to claim 1 further comprising means for displaying the residual number of times of possible recording or the residual cumulative possible recording time duration.

5. A recordable type optical disc for use with an apparatus for optically recording signals thereon and/or playing back therefrom comprising:

a recordable region wherein signals and administrative signals therefor are recorded by the apparatus, an unrewritable region wherein information for limiting further signal recording is provided and can be played back for comparison with the administrative signals recorded on the recordable region.

6. The recordable type optical disc according to claim 5, wherein said unrewritable region contains information representing the number of times which signals may be recorded on the recordable region.

7. The recordable type optical disc according to claim 5, wherein said unrewritable region contains information representing the cumulative recording time duration of signals to be recorded on the recordable region.

8. The recordable type optical disc according to claim 5, wherein the unrewritable region provides the information in the form of pit configuration.

9. An apparatus for recording signals on a recordable type optical disc having a recordable region wherein signals and administrative signals therefor may be recorded thereby and an unrewritable region wherein information for limiting further signal recording is provided and can be played back therefrom comprising:

means for playing back the information provided on the unrewritable region of the optical disc;

means for playing back the administrative signals provided on the recordable region of the optical disc; and means for inhibiting further signal recording when the administrative signals which are played back designate that a limit for signal recording on the optical disc has been reached.

10. An apparatus for recording signals on a recording type optical disc according to claim 9, wherein the administrative signals on the recordable region and the information on the unrewritable region represent the number of times which signals have been recorded on the recordable region of the optical disc and a limitation for the number of times that signal recording is allowed for the same, respectively.

11. An apparatus for recording signals on a recording type optical disc according to claim 10, further comprising means for displaying the residual number of times allowed for signal recording based upon the comparison of the number of times signals have been recorded on the recordable region and information provided on the unrewritable region of the optical disc.

12. An apparatus of recording signals on a recording type optical disc according to claim 9, wherein the administrative signals on the recordable region and the information on the unrewritable region represent the cumulative recording time duration which has been recorded on the recordable region of the optical disc and the limitation of the cumulative recording time duration for signal recording allowed for the same, respectively.

* * * * *